United States Patent [19]

Gorin et al.

[11] 4,046,496

[45] Sept. 6, 1977

[54] APPARATUS FOR AGGLOMERATING FINELY DIVIDED AGGLOMERATIVE MATERIALS IN A ROTATING DRUM

[75] Inventors: Everett Gorin, Pittsburgh; William A. Jasulaitis, Bridgeville; George E. Wasson; Frank William Theodore, both of Pittsburgh, all of Pa.

[73] Assignee: Consolidation Coal Company, Pittsburgh, Pa.

[21] Appl. No.: 698,223

[22] Filed: June 21, 1976

Related U.S. Application Data

[60] Division of Ser. No. 627,687, Oct. 31, 1975, Pat. No. 3,988,114, which is a continuation of Ser. No. 466,832, May 3, 1974, abandoned.

[51] Int. Cl.² .................... B01J 2/12; B29B 1/02
[52] U.S. Cl. .................... 425/222; 23/313 R; 259/3; 259/33; 259/85; 425/333
[58] Field of Search .......... 425/222, 332, 333, 289; 259/3, 16, 33, 85; 23/313 R

[56] References Cited

U.S. PATENT DOCUMENTS

| | | | |
|---|---|---|---|
| 1,980,130 | 11/1934 | Fasting | 425/222 X |
| 2,778,056 | 1/1957 | Wynne | 425/222 X |
| 2,831,210 | 4/1958 | De Vaney | 425/222 X |
| 3,316,585 | 5/1967 | Kallberg | 425/222 X |
| 3,345,683 | 10/1967 | Eirich et al. | 425/222 |

*Primary Examiner*—Robert L. Spicer, Jr.
*Attorney, Agent, or Firm*—William A. Mikesell, Jr.; D. Leigh Fowler, Jr.; Stanley J. Price, Jr.

[57] ABSTRACT

A rotary drum assembly includes separate agglomerating and hardening drums that are rotated independently of each other. The agglomerating drum has a generally cylindrical configuration with an inner cylindrical wall. A scraper is rotatably positioned within the agglomerating drum in spaced relation to the inner cylindrical wall with its axis spaced from the axis of the drum. The scraper has a tubular body portion with a plurality of parallel rows of blades extending radially therefrom. Each of the rows extends lengthwise along substantially the entire length of the scaper body portion and follow a helical path having a single turn about the axis of the tubular body portion. The rows of blades thus make a single convolution about the scraper body portion. Drive means are provided to synchronously rotate the agglomerating drum and scraper with the scraper arranged to rotate at a preselected and different speed relative to the speed of the drum. Agglomerative material is introduced into the rotating agglomerating drum and forms a layer of agglomerative material on the drum inner cylindrical wall. The scraper is rotated in the same direction as the direction of rotation of the agglomerating drum and at a preselected synchronous speed with the agglomerating drum. The rows of parallel blades on the scraper form a plurality of spaced elongated generally longitudinal ridges and valleys in the layer of agglomerative material on the drum cylindrical wall. The ridges have a slight arcuate configuration and form less than a single convolution throughout the entire length of the agglomerating drum. The spaced elongated ridges in the layer of agglomerative material extend lengthwise in the drum substantially parallel to the axis of the drum and serve as longitudinally extending lifters to mix and agitate other particulate agglomerative materials introduced into the drum by lifting portions of the other particulate agglomerative material from the underside of the bed and depositing the material on the upper surface of the bed. This type of mixing promotes the formation of agglomerates having a preselected relatively narrow size range. The synchronous rotation of the scraper removes agglomerative material deposited on the surface of the elongated ridges and valleys formed in the layer of agglomerative material so that the desired ridge and valley configuration is maintained in the layer of agglomerative material.

6 Claims, 14 Drawing Figures

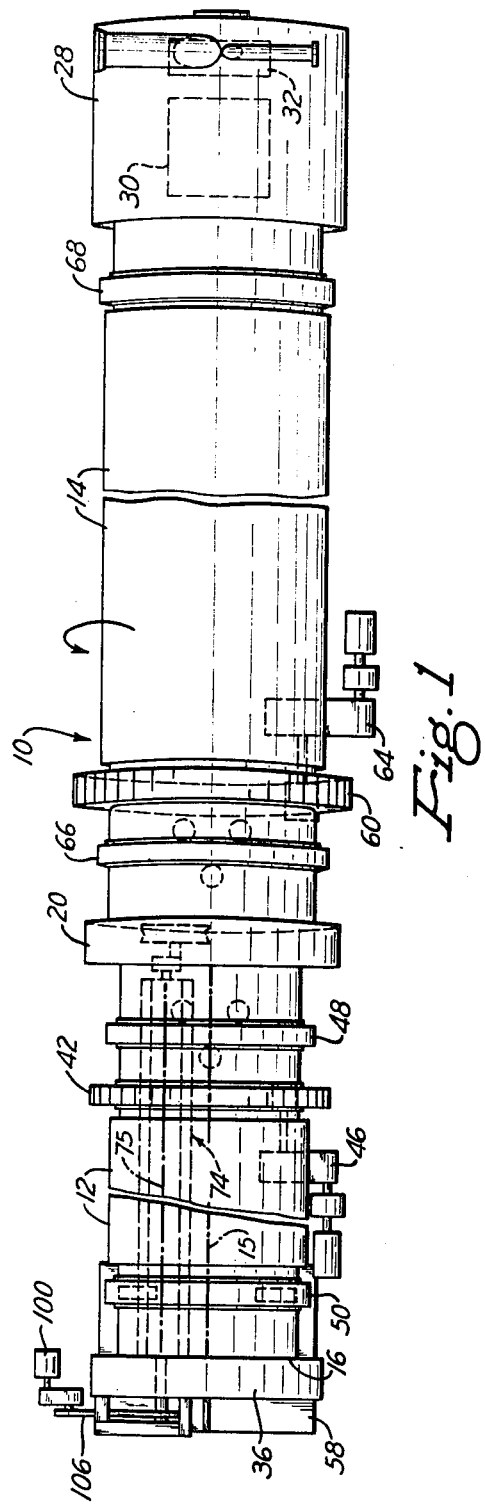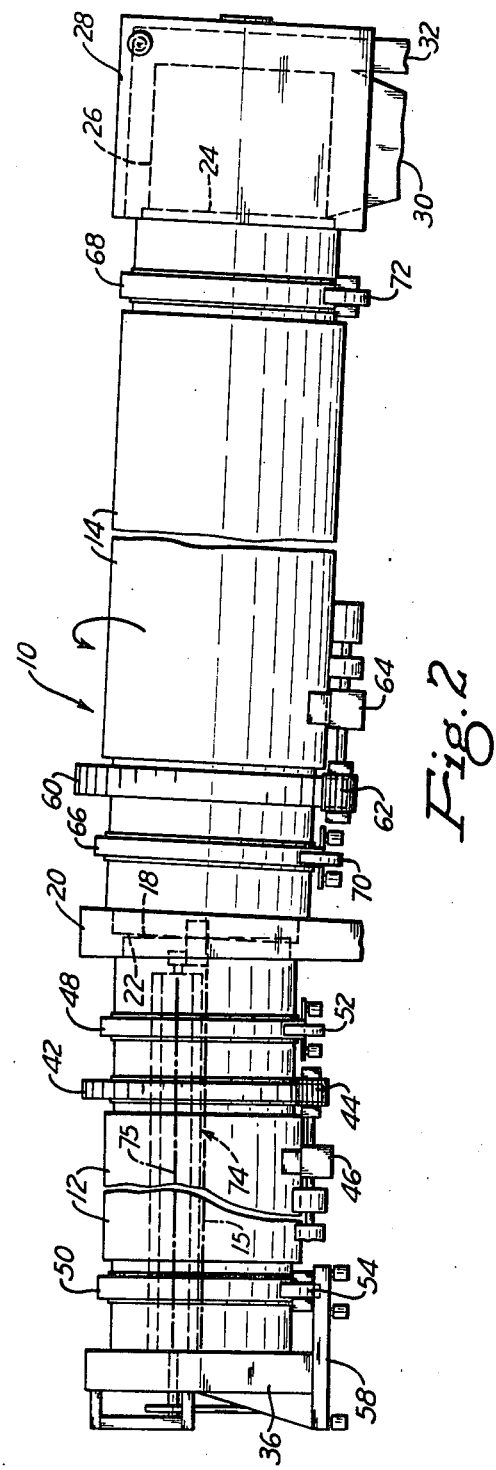

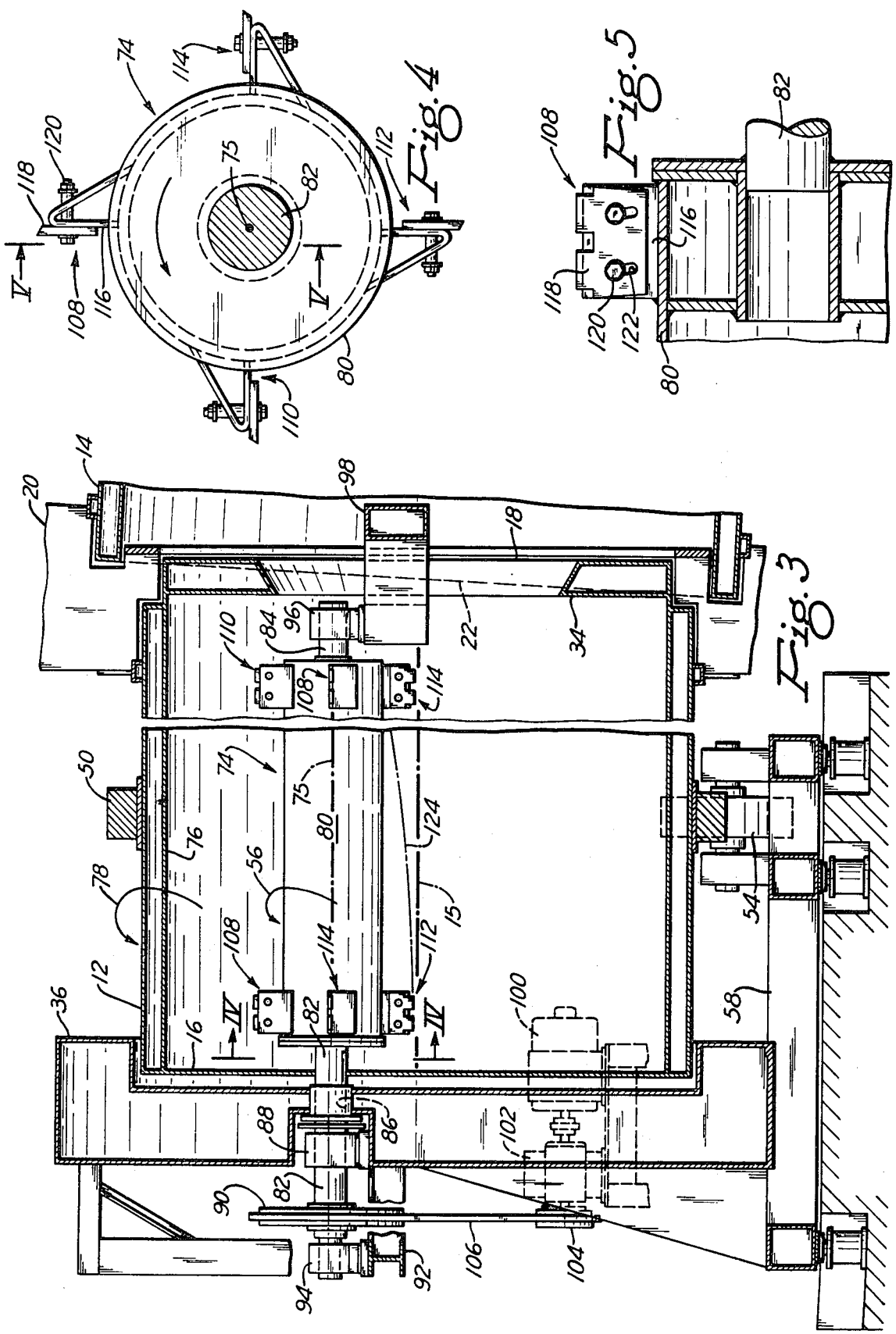

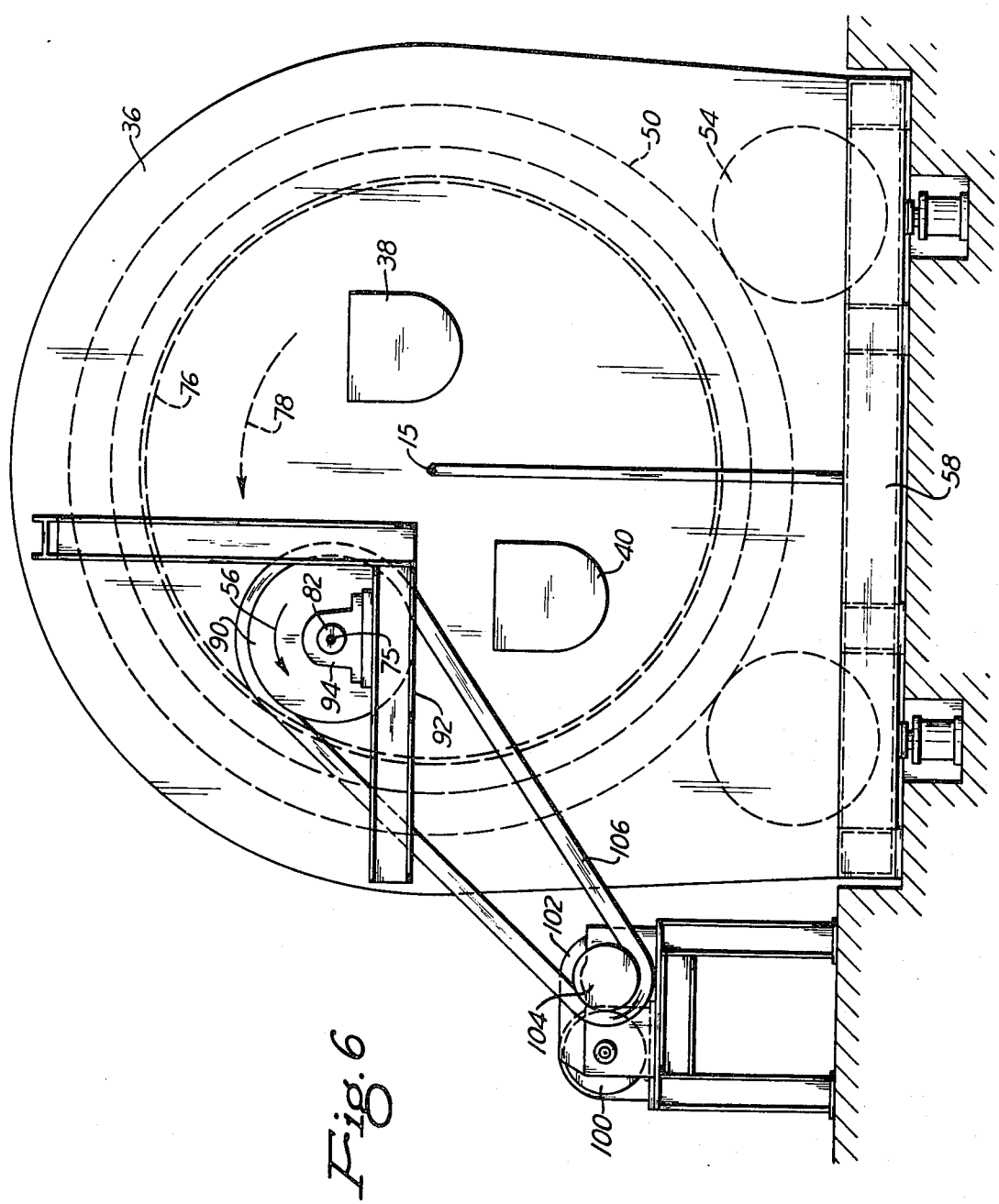

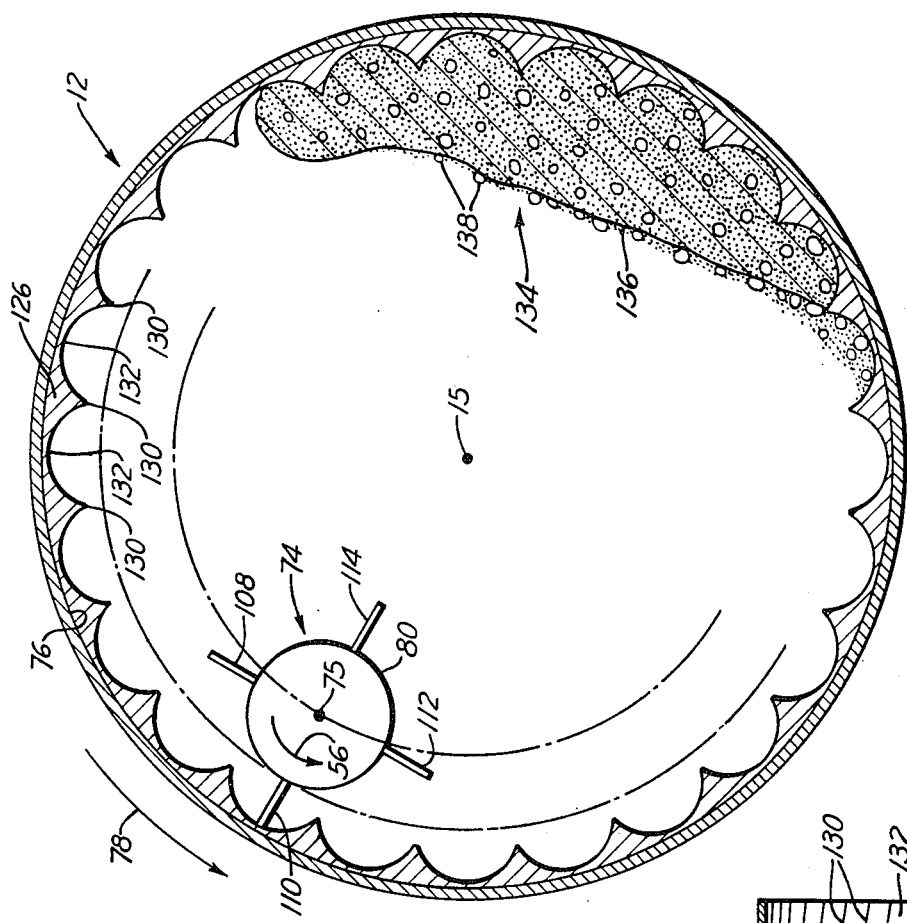
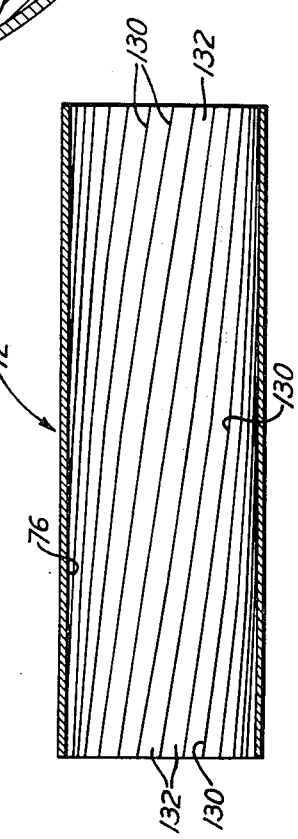

APPARATUS FOR AGGLOMERATING FINELY DIVIDED AGGLOMERATIVE MATERIALS IN A ROTATING DRUM

CROSS-REFERENCES TO RELATED APPLICATIONS

This application is a division of copending application Ser. No. 627,687 filed Oct. 31, 1975 now U.S. Pat. No. 3,988,114 which, in turn, is a continuation of application Ser. No. 466,832 filed on May 3, 1974, now abandoned.

BACKGROUND OF THE INVENTION

1. Field of the Invention

This invention relates to a method and an apparatus for agglomerating finely divided agglomerative materials in a rotating drum and more particularly to a method and an apparatus for agglomerating finely divided coal particles and finely divided particles of carbonaceous residue in a rotating drum to form carbonaceous agglomerates.

2. Description of the Prior Art

The process for making formcoke as described in U.S. Pat. Nos. 3,073,751; 3,401,089 and 3,562,783 includes introducing particulate bituminous coal and finely divided char (the solid carbonaceous residue of coal which has been distilled at a temperature of between 800° F. and 1400° F.) in a rotary retort. Depending on the type of coal employed and the ratio of coal to char, pitch may also be added as a binder and to increase the strength of the agglomerates formed in this process. Preferably, the particulate coal and finely divided char are heated to an elevated temperature before they are introduced into the rotary retort so that the constituents supply as sensible heat substantially all of the heat required to achieve the desired temperature for agglomerating the carbonaceous materials.

During the agglomeration process the retort is rotated to effect intimate mixing of the constituents and tumbling of the agglomerates as they are formed. As the constituents are mixed in the retort the coal particles are further heated to such extent that partial distillation of the coal particles occurs, evolving tar and forming a loosely coherent plastic sticky mass in the retort. Where a pitch binder is employed it further contributes to the agglomeration of the particulate material within the retort.

It is believed that the loosely coherent plastic mass formed in the rotary retort breaks up during tumbling into relatively fine plastic particles. Growth of the plastic particles is attained by a snowballing type of tumbling or rolling action on the upper exposed inclined surface of the plastic mass of particulate material in the retort. Repeated tumbling or rolling of the particles causes the continued growth of the plastic particles into agglomerates. The agglomerates continue to grow until the binder evolved by the coal particles and the pitch binder, if employed, loses its plasticity. Thereafter, the agglomerates rigidify and the growth process is stopped. The agglomerates recovered from the agglomerating retort are thereafter calcined at an elevated temperature between 1500° F. and 1800° F. and formcoke is obtained that has strength and abrasion resistance that is equal or superior to that of conventional blast furnace coke. One of the objectives of the above described formcoke process is to form closely sized agglomerates having a suitable size range as, for example, a size range of between ¾ × 2 inches or a size range of between 1 × 3 inches. Oversized agglomerates, i.e. agglomerates having a size greater than the desired size, and undersized agglomerates, i.e. agglomerates having a size less than the desired size, may not be suitable for use in a conventional blast furnace or other conventional metallurgical processes.

It has been discovered that, in conventional sized retorts, agglomerates of a suitable size range can be obtained in shallow beds where the ratio of the absolute bed depth of the particulate material to the diameter of the retort is maintained below a critical value. The absolute bed depth designates the true dimensional depth of the bed occupied by the carbonaceous materials and is measured at the deepest point in the bed of carbonaceous material within the rotary retort. It has been found where the ratio of absolute bed depth to retort diameter is maintained below the critical ratio (shallow bed) substantially all of the agglomerates have a size less than 4 inches and a substantial portion of the agglomerates have a suitable size range. Where, however, the ratio of absolute bed depth to retort diameter is increased above the critical ratio to form a deep bed the agglomerate product formed has a substantial quantity of agglomerates with a size greater than 4 inches and a reduced quantity of agglomerates with the suitable size range.

From an economic standpoint it is desirable to use retorts having as large a diameter as possible and to maintain as deep a bed of carbonaceous material as possible in the rotating retort. With these conditions, however, it is also essential that the size range of the agglomerate product formed be within the suitable size range.

In U.S. Pat. Nos. 3,368,012 and 3,460,195 there is disclosed a rotary retort for agglomerating carbonaceous material in a deep bed in which the ratio of absolute bed depth to retort diameter may be increased above the aforementioned critical ratio and a substantial yield of agglomerates of a suitable size range is obtained. In accordance with the teaching of these patents, preheated particulate bituminous coal and finely divided char are agglomerated into a rotary retort that has a plurality of longitudinally extending rakes secured to the rotary retort inner cylindrical wall. Each of the rakes has a plurality of tines extending inwardly toward the center of the rotary retort and the tines have a length between one-fourth and one-third the diameter of rotary retort. The tines on the rakes are spaced from each other a preselected distance to relieve the compaction pressure exerted on the bed of carbonaceous material and to control the size of the agglomerates formed in the retort. An agglomerate product having a suitable size range is obtained even when the ratio of absolute bed depth to retort diameter is increased substantially above the ratio previously considered the critical ratio to obtain an acceptable yield of agglomerates having a suitable size range.

During the agglomeration process the carbonaceous materials have a tendency to adhere as a sticky plastic mass to the inner wall of the rotary retort and to the rake tines. Separate apparatus is required to remove the accumulation of agglomerated carbonaceous materials adhering to the retort wall and to the rake tines. Because of the tine spacing difficulty is encountered in removing the deposits of carbonaceous material on the retort wall and on the rake tines. Further, a substantial amount of energy is required to rotate the retort while the apparatus, such as a fixed scraper device, removes the carbonaceous deposits from the retort inner wall and rake tines.

It is also known in the agglomeration of agglomerative materials that a smooth inner cylindrical wall of the rotary drum or retort is not the optimum surface for forming agglomerates. Various types of metallic lifters for the agglomerative material within the rotary drum have been proposed as, for example, the lifters disclosed in U.S. Pat. Nos. 3,124,338; 2,695,221; 2,926,079; 2,213,056 and 3,689,044. These lifters are not suitable, however, where the agglomerative material has a tendency to adhere to the inner wall of the drum. After a short period of time a layer of the agglomerative material is formed on the wall of the drum to a depth that is equal to or greater than the height of the metallic lifters. This layer of agglomerative material reduces and soon eliminates the effect of the metallic lifters.

U.S. Pat. No. 3,348,262 discloses a fixed scraper for controlling the thickness of the layer or coating of agglomerative material deposited on the inner surface of the rotating drum. The layer has a uniform thickness and a generally relatively smooth surface. U.S. Pat. No. 2,697,068 and 3,316,585 disclose rotary scrapers positioned within the rotary drum that are arranged to continuously remove agglomerative material from the inner wall of the drum and maintain a layer of the agglomerative material of a preselected uniform thickness on the wall of the drum. It is stated the layer of agglomerative material provides a surface that is superior to a smooth cylindrical wall.

U.S. Pat. No. 2,831,210 discloses a cutter bar positioned within the rotary drum adjacent the inner wall of the drum. The cutter bar has spaced teeth extending toward the drum inner wall. The cutter bar is arranged to reciprocate longitudinally relative to the drum wall and cut a series of allochiral left and right hand helical grooves in the layer of agglomerative material deposited on the drum inner wall. The rate of reciprocation of the cutter bar and the speed of rotation of the drum are controlled so that the helical grooves do not track each other on successive strokes of the cutter bar and thus provide a controlled roughness to the surface of the layer of agglomerative material on the drum inner wall. It is stated the roughened surface of the layer is superior to a smooth surface.

U.S. Pat. No. 2,778,056 discloses an agglomerating drum with a scraper positioned therein. The drum and scraper are arranged to rotate at preselected synchronous speeds with the scraper rotating in a direction opposite to the direction of drum rotation. The scraper disclosed is in the form of a "ribbon flight" conveyor and forms multiple convolutions of helical grooves in material adhering to the inner surface of the drum. The convolutions of the main portion of the scraper have the direction of a right handed thread so that the multiple convolutions formed in the surface of the material adhering to the inner surface of the drum are so inclined that loose material in the grooves tends to move back toward the inlet of the drum. Adjacent the ends of the drum the direction of thread rotation of the scraper is reversed to minimize spillage of the material fed into the drum and also accelerate the discharge of the agglomerates formed. The helical grooves formed in the material adhering to the inner surface of the drum extend generally circumferentially around the inner surface of the drum so that the material within the drum tends to roll or slide downwardly within the grooves and be carried back towards the entrance of the drum. The ridges formed between the grooves because of their generally circumferential arrangement around the inner surface of the drum do not function as lifters to mix the material within the drum.

In a method and an apparatus known to applicants for agglomerating finely divided agglomerative material in which a limited number of generally longitudinally extending ridges and valleys can be formed in a layer of agglomerative material deposited on the inner wall of a drum. The ridges and valleys are formed by an elongated scraper device positioned adjacent the drum inner wall and arranged to rotate in a direction opposite to the direction of the drum. The height of the ridges formed by the method and apparatus disclosed in the above mentioned co-pending application are limited by the direction of rotation of the scraper device relative to the drum. For example, where the scraper has a pair of radially opposed blades extending longitudinally along the scraper tube and where a maximum height of the ridge is desired only four ridges can be formed around the periphery of the interior wall of the drum. As the number of ridges increase the height of the ridges decrease. Thus, limitations on ridge height and the number of ridges formed in the wall are present where the rotary scraper rotates in a direction opposite to the direction of drum rotation. Under certain agglomerative conditions it is highly desirable for optimum agglomerative conditions to have a plurality of ridges of a height greater than the height attainable by rotating the scraper in a direction opposite to the drum and further to provide a greater number of ridges on the periphery of the drum having the desired ridge height.

There is a need for a method and apparatus to provide elongated generally longitudinally extending ridges and valleys in a layer of agglomerative material deposited on the drum inner wall and to further provide a greater number of elongated ridges and elongated ridges having a greater height than is possible with the method and apparatus disclosed in the above named co-pending application so that the other agglomerative material fed into the drum is more effectively lifted and mixed.

SUMMARY OF THE INVENTION

This invention relates to a method and an apparatus for agglomerating finely divided agglomerative material in a rotating drum. The method includes feeding finely divided agglomerative material into a drum rotating about its longitudinal axis and having a generally cylindrical inner wall. The rotation of the drum deposits a layer of the finely divided agglomerative material of the drum inner wall and rotating a scraper in the drum in the same direction as the direction of rotation of the drum at a preselected speed relative to the drum speed to form a plurality of elongated longitudinally extending alternating ridges and valleys in the layer of finely divided material deposited on the drum inner wall. The ridges and valleys are substantially parallel to the longitudinal axis of the drum. The method further includes maintaining the ridges and valleys so formed in the layer deposited on the drum inner wall while rotating the drum and forming agglomerates from other finely divided agglomerative material introduced into the rotary drum. The number of ridges is a whole number and the number of ridges is determined by the following formula.

$$N = (b\ U_2/U_1)$$

wherein

N = number of ridges formed
b = number of scraper blades
$U_1$ = drum speed, rpm
$U_2$ = scraper speed, rpm.

The apparatus for agglomerating the finely divided agglomerative material includes a cylindrical rotary drum having an inner wall. Means are provided to rotate the drum about its longitudinal axis at a preselected speed and deposit a layer of the finely divided agglomerative material on the drum inner wall. A rotary scraper with blade means extending outwardly therefrom is rotatably supported in the drum in spaced relation to the drum inner wall with the longitudinal axis of the rotary scraper spaced from the longitudinal axis of the rotary drum. Means are provided to rotate the rotary scraper in the same direction as the direction of rotation of the drum in timed relation to the rotation of the drum and provide relative movement between the rotary drum inner wall and the scraper blade means to form a plurality of longitudinally extending alternating ridges and valleys in the layer of agglomerative material deposited on the drum inner wall. The rotary scraper is further arranged to remove other finely divided agglomerative material deposited on the surface of the ridges and valleys that have been formed in the layer of finely divided agglomerative material.

The above method and apparatus are particularly suitable for agglomerating finely divided carbonaceous materials at an elevated temperature and forming a substantial quantity of agglomerates having a preselected size range. The carbonaceous materials at an elevated temperature are introduced into a rotating drum which serves as a retort and a layer of carbonaceous material is deposited on the retort inner cylindrical wall. A plurality of longitudinally extending spaced ridges and valleys are formed in the layer of carbonaceous material with the ridges and valleys extending substantially parallel to the retort longitudinal axis. After the binder in the carbonaceous particles is evolved the layer of carbonaceous material loses its plasticity and rigidifies to form a relatively rigid layer with ridges and valleys formed therein.

As other finely divided carbonaceous material is introduced into the rotating retort the carbonaceous material forms a bed in the retort with an upper surface extending upwardly in the direction of rotation of the retort. The longitudinally extending ridges of carbonaceous material formed on the inner wall serve as lifters to convey or lift a portion of the finely divided carbonaceous material adjacent the retort inner wall in the direction of retort rotation and deposit at least a portion of this carbonaceous material on the upper surface of the bed to both intimately mix the finely divided carbonaceous material in the retort and deposit particles on the upper inclined surface of the bed. Repeated tumbling of the particles and partially formed agglomerates on the upper surface of the bed causes continued growth to form agglomerates of a preselected size. Any finely divided carbonaceous material deposited on the exposed surface of the ridges and valleys is continually removed therefrom so that the ridges and valleys of a preselected configuration are maintained during the agglomeration process. Where desired, metallic lifters, such as elongated metallic members, of proper dimension may be secured to the retort inner wall to provide support for the longitudinally extending ridges of carbonaceous material and also serve as an integral portion of the lifters.

With the above arrangement a plurality of spaced elongated ridges is formed on the inner wall of the rotating retort to serve as lifting or mixing devices for the finely divided carbonaceous material. The scraper positioned in the retort that initially shaped the elongated longitudinally extending ridges and valleys in the layer of carbonaceous material further removes other agglomerative carbonaceous material that may be deposited on the surface of the ridges and valleys so that the layer of carbonaceous material retains its ridge and valley configuration during the agglomeration process.

Accordingly, the principal object of this invention is to provide a method and an apparatus for forming elongated longitudinally extending ridges and valleys in a layer of agglomerative material deposited on the inner wall of a rotary drum.

Another object of this invention is to provide a method and an apparatus for maintaining a plurality of spaced longitudinally extending lifters formed of agglomerative material on the inner wall of a rotary drum.

These and other objects and advantages of this invention will be more completely disclosed and described in the following specification, the accompanying drawings and the appended claims.

BRIEF DESCRIPTION OF THE DRAWINGS

FIG. 1 is a top plan view of a rotary drum assembly having separate balling and hardening drums.

FIG. 2 is a view in side elevation of the rotary drum assembly, illustrating the rotary scraper rotatably supported in the balling drum.

FIG. 3 is an enlarged view of the balling drum in side elevation and section, illustrating the support and drive for the rotary scraper and schematically the longitudinally extending rows of scraper blades.

FIG. 4 is a view in section taken along the line IV—IV of FIG. 3, illustrating in detail the rotary scraper with four rows of scraper blades extending radially therefrom.

FIG. 5 is a fragmentary view in section taken along the line V—V of FIG. 4, illustrating a scraper blade element of a row of scraper blades adjustably secured to the blade support.

FI. 6 is a view in end elevation of the balling drum feed and illustrating the relative position of the rotary scraper in the balling drum.

FIG. 7 is a diagrammatic view in section and in elevation of the balling drum, illustrating schematically the rotary scraper within the balling drum rotating in the same direction as the direction of the drum rotation and the manner in which the longitudinally extending ridges and valleys are formed in a layer of agglomerative material on the inner wall of the drum with the longitudinally extending ridges serving as lifters for the particulate agglomerative material within the balling drum.

FIGS. 8, 9, 10, 11 and 12 are fragmentary views in section similar to FIG. 7, illustrating the number and types of longitudinally extending ridges and valleys formed in the layer of agglomerative material when the rotary scraper is rotated at speeds of 4, 5, 6, 7 and 8 times faster than the speed of the drum respectively.

Figure 13:
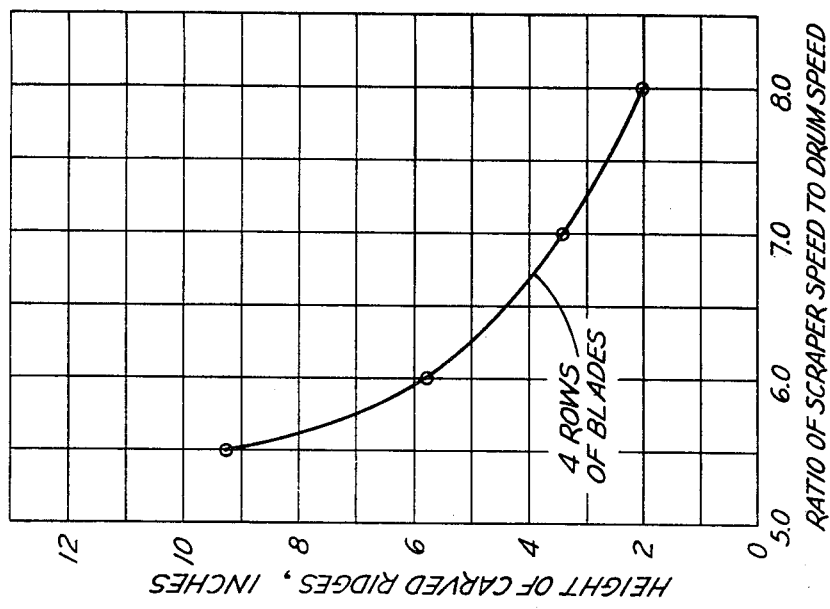

FIG. 13 is a graphical representation of the heights of the ridges formed in the layer of agglomerative material when the rotary scraper is rotated in the same direction as the rotary drum and at various ratios of scraper speed to drum speed with a drum having an effective diameter of 141 inches and a scraper having a diameter of 45.1 inches.

FIG. 14 is a schematic longitudinal section of the agglomerating drum, illustrating the configuration of the longitudinally extending ridges and valleys formed in the layer of agglomerative material deposited on the inner surface of the agglomerating drum.

DESCRIPTION OF THE PREFERRED EMBODIMENT

Throughout the specification the rotary cylindrical drum will also be referred to as a rotary retort or kiln. The terms rotary retort or kiln are intended to designate a cylindrical drum in which partial distillation of one or more of the constituents takes place during the agglomeration process. Although the preferred method includes the partial distillation of coal during the agglomeration process, it should be understood that it is not intended to limit the invention to such a process and the invention may be practiced with materials that agglomerate at ambient temperature. It is not intended, by illustrating and describing the rotary cylindrical drum assembly herein as including a separate agglomerating drum and a separate hardening drum, to be limited to such an assembly. The invention may also be practiced in a single cylindrical drum assembly. The agglomerating drum in this specification is also referred to as a balling drum.

Referring to the drawings and particularly FIGS. 1 and 2 there is illustrated a rotary drum assembly generally designated by the numeral 10 that includes separate balling and hardening drums designated by the numerals 12 and 14, respectively. The balling drum 12 has a generally cylindrical configuration with a front feed or inlet opening 16 and a rear discharge opening 18 and a longitudinal axis 15 about which the balling drum 12 rotates. The discharge opening of drum 12 extends into a stationary housing 20. The hardening drum 14 also has a generally cylindrical configuration with an inlet opening 22 that extends into the fixed stationary housing 20 and a discharge opening 24 with a trommel screen 26 connected thereto. The trommel screen 26 is enclosed by a housing 28 that has outlets 30 and 32 for agglomerates separated according to size by the trommel screen 26. As shown in FIG. 3, the discharge opening 18 of balling drum 12 extends into the inlet opening 22 of hardening drum 14 so that agglomerates formed in the balling drum 12 are discharged directly into the hardening drum 14. The balling drum outlet opening 18 has an annular dam 34 that controls the inventory of agglomerative material and agglomerates in the balling drum 12. A sealed housing 36 surrounds the balling drum inlet opening 16 and, as illustrated in FIG. 6, suitable inlets 38 and 40 are provided in the housing 36 for introducing agglomerative material, such as coal and char, into the balling drum 12.

As illustrated in FIGS. 1 and 2, the balling drum 12 has an annular gear 42 secured thereto that meshes with a drive gear 44 connected to a suitable drive means designated by the numeral 46. The balling drum 12 has a pair of annular metallic tires 48 and 50 that rotatably support the drum 12 on roller assemblies 52 and 54 and limit axial movement of balling drum 12. The roller assemblies 52 and 54 and the front housing 36 are supported on a platform 58 that is movable vertically to change the angle of inclination of the balling drum 12. The balling drum longitudinal axis 15, i.e. the axis of rotation, is substantially horizontal and where desired the platform 58 may be utilized to incline the balling drum 12 axis of rotation to control the residence time of the material therein. The hardening drum 14 has a similar annular gear 60 secured thereto that meshes with a drive gear 62. A separate drive means 64 rotates the hardening drum 14 at a preselected speed that is independent of the speed of rotation of the balling drum 12. Annular metallic tires 66 and 68 support the hardening drum 14 on roller assemblies 70 and 72 to permit rotation of the hardening drum 14 by the drive means 64 and prevent axial movement of the hardening drum 14 during rotation thereof.

Referring to FIGS. 3 and 6, a scraper generally designated by the numeral 74 has a longitudinal axis 75 and is rotatably positioned within the balling drum 12 in spaced relation to the drum inner wall 76. The rotary scraper 74 is located above a horizontal plane extending through the longitudinal axis 15 of the drum 12 and, as viewed in FIG. 6, on the left side of a vertical plane extending through the longitudinal axis of drum 12. With this arrangement the rotary scraper 74 is positioned in the upper left quadrant of the cylindrical opening in the balling drum 12 as defined by the inner drum wall 76 and is arranged to rotate about its longitudinal axis 75. As later explained, the position of the rotary scraper is determined by the direction of drum rotation. For example, as viewed in FIGS. 6 and 7, drum rotation is in a counter-clockwise direction as indicated by the directional arrow 78 and the rotary scraper 74 is positioned in the upper quadrant opposite from the inclined bed of agglomerative material formed within balling drum 12.

The rotary scraper 74 has a tubular body portion 80 with a front end shaft 82 and a rear end shaft 84 secured thereto and extending therefrom. It should be understood that the body portion 80 may also be solid and of a configuration other than a cylinder. The body portion 80 may have a smaller transverse dimension than illustrated as long as the body portion has sufficient strength to rotatably support the blades. The front end shaft 82 extends through a suitable seal 86 in the housing 36 and is rotatably supported in a bearing 88 mounted on the housing 36. The front end shaft 82 has a sprocket 90 nonrotatably secured thereto and the front end shaft is supported in another bearing 94 which, in turn, is supported on a fixed beam 92. The rear end shaft 84 is rotatably supported in a bearing 96 which is supported on a fixed support beam 98. The beam 98 is secured to a portion of the fixed housing 20 enclosing the balling drum outlet opening 18 and the hardening drum inlet opening 22. With this arrangement the scraper 74 is rotatably supported within the balling drum 12 and is supported at its end portions in bearings.

The drive for rotating the scraper 74 includes a drive motor 100, illustrated in FIGS. 3 and 6, connected through a suitable speed reducer 102 to a drive sprocket 104. An endless chain 106 is reeved about the sprockets 90 and 104 and is arranged to rotate the scraper 74 in the same direction as the direction of rotation of the drum 12 as indicated in FIGS. 3, 6 and 7 by the directional arrow 56. Suitable control means are provided to rotate the scraper 74 in synchronous relation with the balling drum 12 so that the scraper 74 rotates at a preselected speed ratio with the balling drum 12. Where desired the control means can be arranged to change the relative speeds of the scraper or the drum to obtain other speed ratios between the scraper and the drum so that, as later discussed, other ridge and valley configurations may be obtained.

The scraper 74 has four rows of scraper blades generally designated by the numerals 108, 110, 112 and 114 secured to the outer surface of the tube 80. The rows of blades include separate blade assemblies that have a blade support member 116 rigidly secured to the surface of the tube 80 as by welding or the like. Separate blades or blade segments are secured to the blade support members 116 by means of bolts 120. The blade segments 118 have elongated slotted portions 122 that permit radial adjustment of blade segments 118 on the blade support members 116.

The rows of blades 108, 110, 112 and 114 are parallel and extend lengthwise along the tube 80 to form elongated continuous cutting surface along substantially the entire length of the scraper 74. In FIG. 3 only the end portions of the rows of blades 108, 110, and 112 are illustrated. The continuous cutting surface formed by the rows of blades preferably follows an arcuate generally helical path in which the helix has less than a single turn about the axis 75 of the tube 80 throughout the length of the scraper 74 as is diagrammatically illustrated by the --.-- line 124 in FIG. 3.

The scraper 74 thus has four separate rows of blades extending lengthwise throughout substantially the entire length of the scraper 74. The rows of blades follow a helical path and preferably form a helix not exceeding a single turn about the tube axis in which the rows of blades are displaced to the left about the axis 75 as viewed in FIG. 3 between the front and rear of the scraper 74. It should be understood that other blade configurations may be employed that have the rows of blades arranged parallel to the longitudinal axis of the scraper tube 80 or form a helix with more than one turn about the tube axis. The blade arrangement should be such, however, that the ridges formed in the material adhering to the drum inner wall extend longitudinally along the drum inner surface and are substantially parallel to the axis of the drum. With this arrangement the ridges formed by the blades serve as longitudinally extending lifters to lift and mix the material in the drum.

It should also be understood that the number of rows of blades secured to the outer surface of the tube 80 can be increased or decreased as, for example, the scraper 74 can have one, two or three rows of blades rather than four rows as illustrated. It is desirable, however, that the rows of blades be equidistantly positioned on the periphery of the scraper tube 80 to provide symmetrical ridges and valleys in the layer of agglomerative material deposited on the balling drum inner wall 76.

Referring to FIGS. 7 and 14, there is illustrated diagrammatically the manner in which the rotary scraper 74 forms ridges and valleys in the layer of agglomerative material deposited on the inner wall 76 of balling drum 12 and the manner in which the ridges serve as lifters to admix the agglomerative constituents and aid in forming agglomerates of a preselected size range from the agglomerative material.

To form a corrugated or scalloped surface with longitudinally extending ridges and valleys on the wall of the balling drum, agglomerative material is first introduced into the balling drum. Where particulate bituminous coal, finely divided char and pitch are the agglomerative constituents, the coal may be preheated to a temperature of between 400° F. and 625° F. which is below the temperature at which the surface of the coal particles becomes plastic and sticky. The char is preheated to a temperature between 1000° F. and 1200° F. to supply the sensible heat required for the agglomeration process. The coal, char and pitch at the above elevated temperatures are introduced into the balling drum 12 as the balling drum 12 is rotating in a counterclockwise direction as illustrated in FIG. 7.

The agglomerative constituents are mixed by the rotation of the drum 12 and heat is transferred from the char to the coal particles and pitch and the agglomerative constituents form a sticky plastic mass. A layer of the sticky plastic mass is deposited on the inner surface 76 of the balling drum 12. The rotary scraper 74 is synchronously rotated in the same direction as the direction of rotation of the balling drum 12 and at 6 times the speed of the balling drum 12. At this synchronous speed the rows of scraper blades 108, 110, 112 and 114 periodically move toward and away from the wall of the drum 12.

Because the rotation of the scraper is synchronous with the rotation of the drum at a ratio of 6 to 1, twenty-four elongated ridges generally designated by the numeral 130 are formed in the layer of agglomerative material 126. The rows of scraper blades are so spaced from the drum wall 76 that the layer of agglomerative material deposited on the drum wall 76 is continuous and elongated valleys generally designated by the numeral 132 are formed in the agglomerative material between the ridges 130. While the layer of agglomerative material is being deposited on the drum wall 76 and is being shaped by the scraper 74 the agglomerative material in the layer is plastic and flexible. When the binder associated with the coal and pitch loses its plasticity due to the pyrolysis that takes place at the elevated temperature within the drum the layer hardens and rigidifies to retain the longitudinally extending ridge and valley configuration above discussed.

The material to be formed into agglomerates, preferably the same material employed in forming the corrugated or scalloped layer on the drum wall, may be introduced into the drum while the layer is hardening or after the layer has hardened. The agglomerative material is introduced on a continuous basis into the rotating drum at a preselected rate to form a bed of agglomerative material within the drum. The bed is designated by the numeral 134 in FIG. 7. Rotation of the drum in the direction indicated by the arrow 78 moves the bed of agglomerative material upwardly along one side of the retort to an extent that the top surface 136 of bed 134 has, for example, an angle of repose of about 70°. The angle of repose is dependent on the speed of rotation of the drum 12. As the drum 12 rotates the longitudinally extending ridges 130 in the layer 126 move under the bed of agglomerative material and promote agitation of the bed. The agitation of the bed includes top to bottom mixing whereby a portion of the agglomerative material in the bed adjacent the drum wall 76 is conveyed upwardly through the bed. The longitudinally extending ridges further turn a substantial portion of this agglomerative material in the portion conveyed by the longitudinally extending ridges and valleys over and onto the bed top surface 136.

Moving a portion of the agglomerative material upwardly through the bed and turning a portion of the agglomerative material over thoroughly admixes the agglomerative material and also continuously deposits partially agglomerated agglomerates 138 on the bed upper surface 136. The partially agglomerated agglomerates 138 roll down the bed upper surface 136 and the partially agglomerated agglomerates grow in size by picking up additional plastic particles from the upper surface of the bed. In order to obtain the above described bottom mixing of the agglomerative material it is essential that the ridges 130 extend longitudinally along the inner surface of the drum, as illustrated schematically in FIG. 14, to be effective as lifters. The angle of inclination of balling drum 12 conveys the partially agglomerated agglomerates as they grow toward the balling drum discharge opening 18. The partially agglomerated agglomerates continue to grow until the binder loses its plasticity and full size agglomerates then harden and rigidify. After the agglomerates harden no further growth takes place. The agglomerates so formed are introduced into the hardening drum where rotation of the hardening drum permits substantial completion of the pyrolysis of the agglomerative constituents and relatively rigid hard agglomerates are withdrawn from the hardening drum.

The agglomerative material in bed 134 because of its plasticity has a tendency to adhere to the interior surface of the layer of rigid agglomerative material deposited on the drum inner wall 76. The scraper assembly 74, because of its continued rotation at a preselected synchronous speed, continuously removes the fresh deposit of agglomerative material on the outer surface of the ridges and valleys while the newly deposited agglomerative material is in a relatively plastic state to thereby maintain the configuration of ridges and valleys as illustrates in FIG. 7. Where desired metallic support members may be secured to the drum inner wall and the ridge portions 130 formed thereon. The metallic support members provide structural support for the ridges and the synchronous rotation of the scraper 74 prevents interference between the metallic support members and the scraper blades.

It may be desirable for certain agglomerative conditions to vary the number and height of the longitudinally extending ridges and valleys formed around the periphery of the drum wall to increase the previously described mixing of the agglomerative material. FIGS. 8, 9, 10, 11 and 12 illustrate the versatility of the method and apparatus for producing longitudinally extending ridges of a desired height and different numbers of longitudinally extending ridges and valleys in the layer of material on the drum wall.

Figure 8:
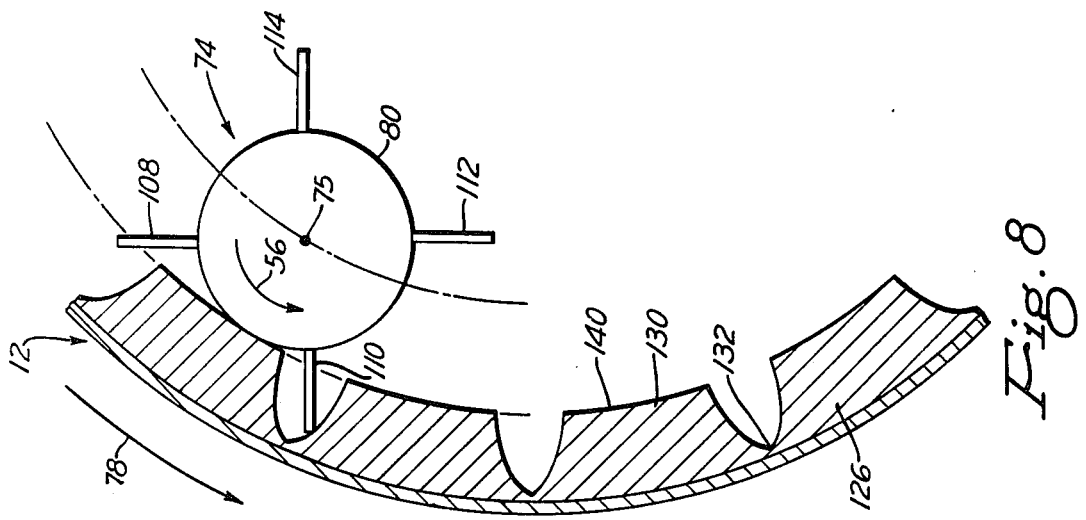

FIG. 8 illustrates the ridge and valley configuration formed when the rotary scraper 74 is rotating in the same direction as the balling drum 12 as indicated by the arrows 78 and 56 with the rotary scraper 74 rotating 4 times faster than the balling drum 12. The ridges 130 have a flat arcuate upper surface 140 that is formed by the scraper tube 80 rubbing on the upper surface of the ridges 130 to thus limit the height of the ridges 130. It should be understood, however, that the tube 80 may have a reduced diameter to provide a greater effective length for the scraper blades 108, 110, 112 and 114. Without interference from the scraper tube 80 the height of the ridges 130 could be increased substantially. The valleys 132 are relatively narrow valleys in FIG. 8 where the rotary scraper 74 is rotating at a speed 4 times faster than the speed of the drum 12.

Figure 9:
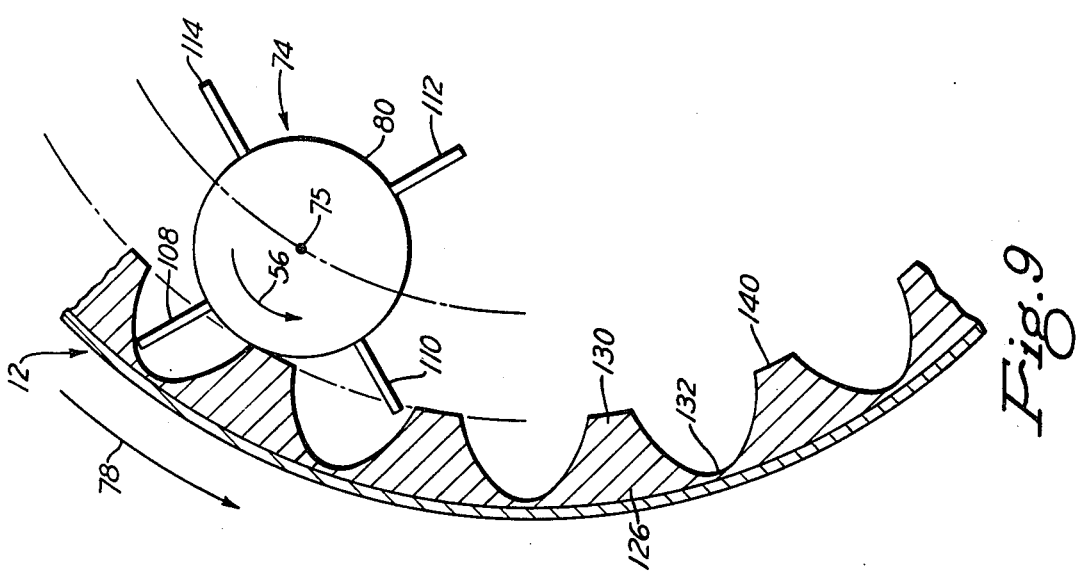

In FIG. 9 the rotary scraper 74 is rotating at a speed 5 times faster than the balling drum 12 and twenty longitudinally extending ridges 130 are formed in the layer of agglomerative material 126. The valleys 132 are broader than the valleys 132 illustrated in FIG. 8 and the ridges 130 have a flat arcuate upper surface 140 caused by the scraper tube 80 rubbing against the ridge upper surface. Thus, the scraper tube 80 also limits the height of the ridge in FIG. 9 and the effective height of the ridges could be increased substantially by reducing the diameter of the scraper tube 80.

Figure 10:
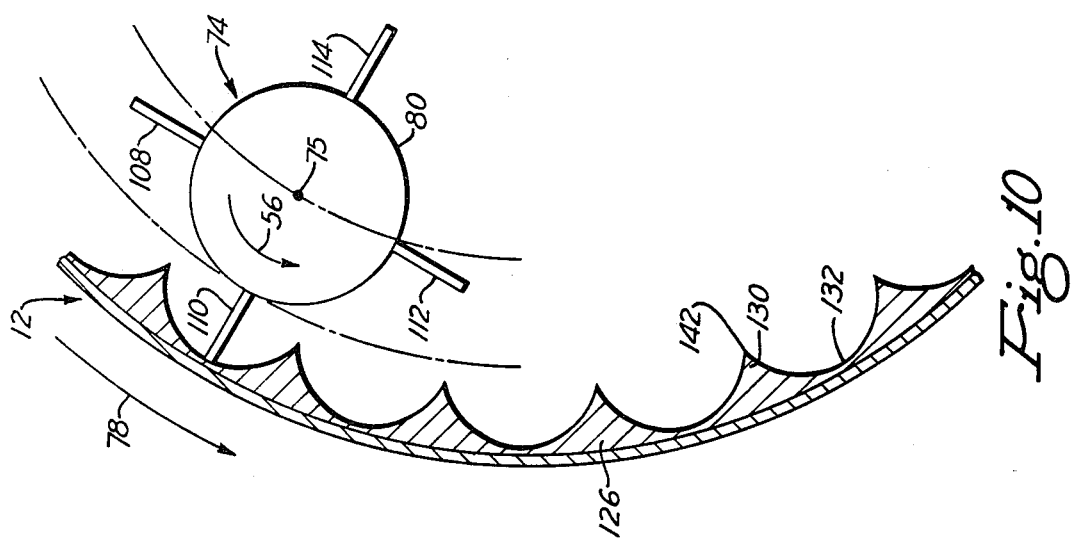

In FIG. 10 there is schematically illustrated the ridge and valley configuration that is obtained when the rotary scraper 74 rotates 6 times faster than the balling drum 12. This ridge and valley configuration is also illustrated in FIG. 7. With this arrangement twenty-four ridges 130 and twenty-four valleys 132 are formed around the periphery of the drum 12. The height of the ridges 130 is less than the ridges illustrated in FIG. 9 and the scraper tube 80 does not interfere with the ridge formation so that the ridges have a pointed upper portion 142. The width of the valleys in FIG. 10 is increased when compared with the valleys illustrated in FIGS. 8 and 9.

Figure 11:
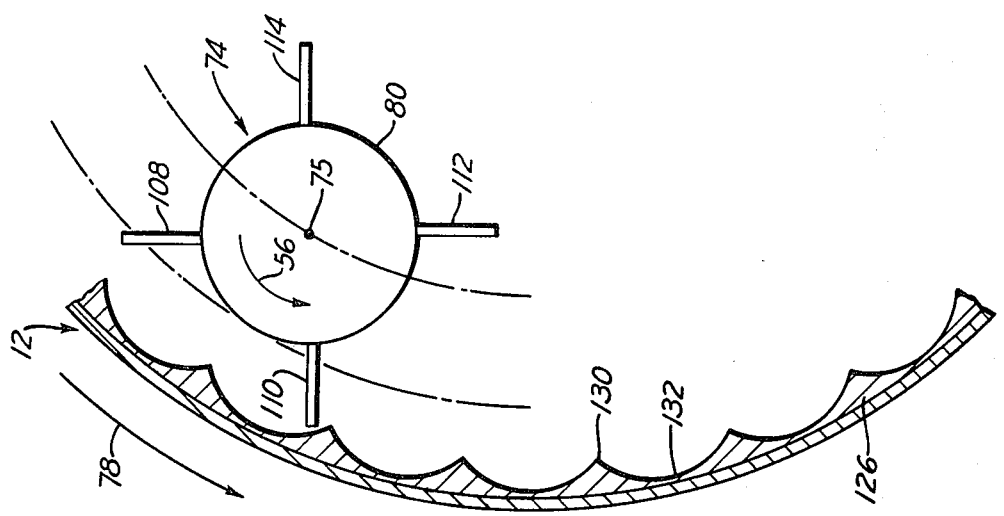

FIG. 11 diagrammatically illustrates the ridge and valley configuration formed in the layer of agglomerative material when the rotary scraper 74 is rotating at a speed 7 times faster than the speed of the drum 12 and in the same direction as the drum 12. At this speed ratio of 7 to 1 twenty-eight ridges and twenty-eight valleys are formed about the periphery of the drum. The ridges have a reduced height when compared with the ridges formed by the scraper at a lower speed ratio as, for example, 6 to 1 as illustrated in FIG. 10.

Figure 12:
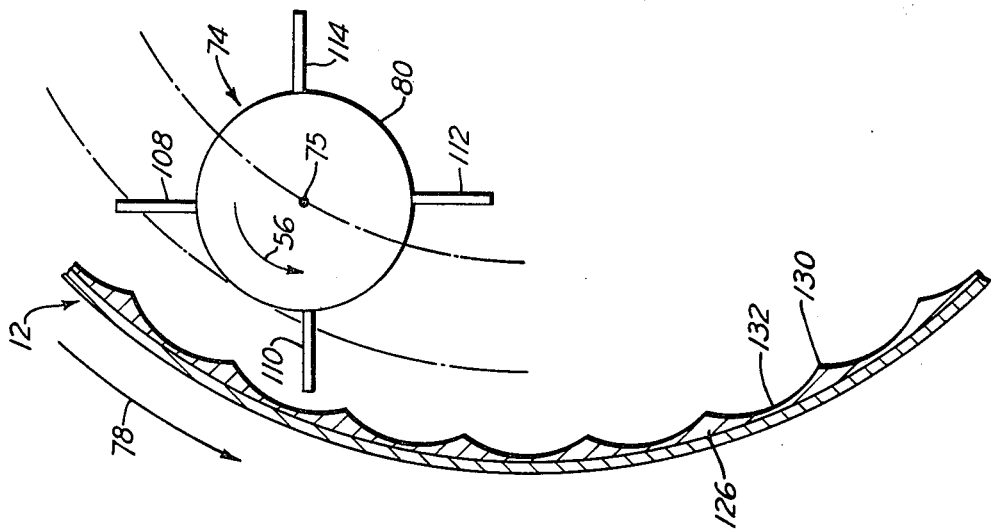

FIG. 12 illustrates the ridge and valley configuration formed when the speed ratio between the scraper and the drum is 8 to 1. At this speed ratio thirty-two ridges and thirty-two valleys are formed in the agglomerative material around the periphery of the balling drum 12. The ridge height in FIG. 12 is further reduced from the ridge height illustrated in FIGS. 10 and 11. It will thus be apparent where a greater number of ridges and valleys are desired the ridge height is reduced as the number of ridges and valleys are increased.

With the above described method, it is essential that the product of the number of rows of blades on the scraper multiplied by the ratio of scraper revolutions to drum revolutions per unit time is a whole number.

$$N = b\, U_2/U_1$$

wherein $N$ = number of ridges formed
$b$ = number of scraper blades
$U_1$ = drum speed, rpm
$U_2$ = scraper speed, rpm.

For example, with a scraper having four rows of blades and the scraper rotating 7 times faster than the drum, twenty-eight longitudinally extending ridges and valleys are formed and the rows of blades will sequentially move in timed relation through the longitudinally spaced valleys without disturbing the adjacent ridges.

Where twenty-two ridges are desired and the rotary scraper has four rows of blades, the ratio of scraper speed to drum speed must be 5.5, as exemplified by the following calculation.

$$N = 4 \times 5.5$$
$$N = 22$$

FIG. 13 illustrates diagrammatically the manner in which the ridge height increases with the decrease in the ratio of scraper speed to drum speed. It will be apparent from FIGS. 8 – 12 and the graph that various configurations of ridge height and numbers of ridges can be formed in the layer of agglomerative material when the rotary scraper 74 is rotated in the same direction as the balling drum. It should be noted that it is also possible with the above method and apparatus to control the thickness of the layer and form ridges and valleys in the layer so deposited on the drum inner wall. The blades on the scraper as they rotate relative to the drum follow arcuate overlapping paths through the layer and thus form the ridges and valleys above discussed.

With the above method and apparatus it is now possible to form lifters of varying number and configuration on the inner surface of the drum from the same or substantially the same material that is agglomerated in the drum. After the lifters in the form of longitudinally extending ridges are formed in the layer of material deposited on the wall of the drum the blades of the rotary scraper 74 remove the material that is deposited on the surface of the ridges and valleys in the layer during the agglomeration process.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. Apparatus for agglomerating finely divided agglomerative material comprising, a cylindrical rotary drum having a longitudinal axis and an inner wall, means to rotate said cylindrical drum about said drum longitudinal axis at a preselected speed and deposit a layer of finely divided agglomerative material on said drum inner wall, an elongated rotary scraper having a body portion with a longitudinal axis, said rotary scraper positioned in said cylindrical drum in spaced relation to said cylindrical drum inner wall with said rotary scraper body portion longitudinal axis spaced from said drum longitudinal axis, blade means extending radially outwardly from said scraper and extending lengthwise thereon, means to rotate said rotary scraper in the same direction of rotation as said drum in fixed timed relation to the rotation of said drum to form a plurality of elongated alternating and longitudinally extending ridges and valleys in said layer of agglomerative material deposited on said drum inner wall according to the following formula:

$N = (b\ U_2/U_1)$ $N$ = a whole number and number of ridges formed $b$ = number of scraper blades $U_1$ = drum speed, rpm $U_2$ = scraper speed, rpm and, said rotary scraper arranged to remove other finely divided agglomerative material deposited on the surface of said longitudinally extending ridges and valleys formed in said layer of agglomerative material.

2. Apparatus for agglomerating finely divided agglomerative material as set forth in claim 1 in which said blade means includes, a plurality of substantially longitudinally extending parallel rows of blades spaced around the periphery of said rotary scraper.

3. Apparatus for agglomerating finely divided agglomerative material as set forth in claim 2 in which, said plurality of substantially longitudinally extending rows of blades includes four rows of blades positioned in spaced relation around the periphery of said rotary scraper, said means to rotate said rotary scraper arranged to rotate said rotary scraper at a speed 6 times the speed of the cylindrical rotary drum to thereby form twenty-four longitudinally extending ridges and twenty-four longitudinally extending valleys in said layer of agglomerative material deposited on the drum inner wall.

4. Apparatus for agglomerating finely divided agglomerative material as set forth in claim 3 in which, said parallel rows of blades having an arcuate configuration in the form of a helix having a single turn about the axis of said scraper body portion to thereby form arcuate parallel longitudinally extending ridges and valleys in said layer of finely divided agglomerative material.

5. Apparatus for agglomerating finely divided agglomerative material as set forth in claim 1 in which, said layer of agglomerative material is a relatively rigid layer of carbonaceous material formed from the agglomeration of finely divided coal and finely divided char.

6. Apparatus for agglomerating finely divided agglomerative material as set forth in claim 1 which includes, positioning said rotary scraper within said rotary drum at a location in a quadrant of said drum diametrically opposite from the quadrant of said drum occupied by said agglomerative material during rotation of said drum.

* * * * *